July 17, 1962  T. P. C. BREUERS  3,044,769
DEVICE FOR SEPARATING TWO SHEETS OF LAMINAR MATERIAL
Filed March 14, 1961  2 Sheets-Sheet 1
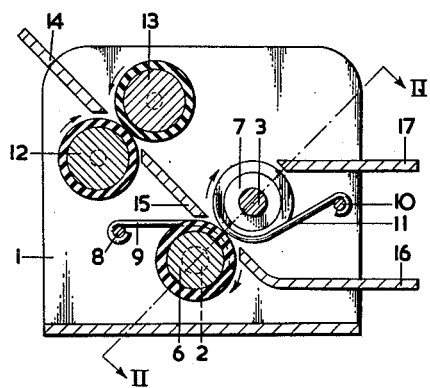
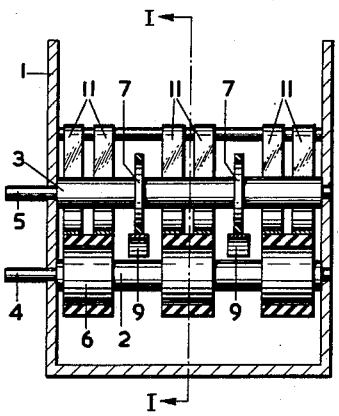
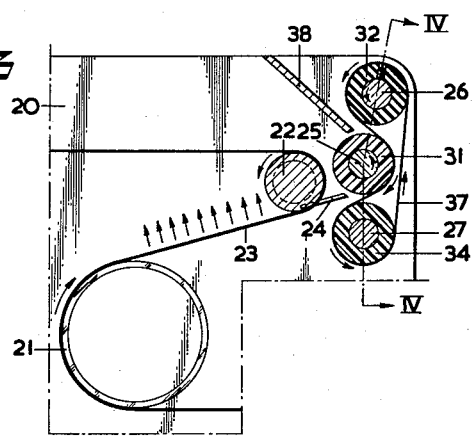
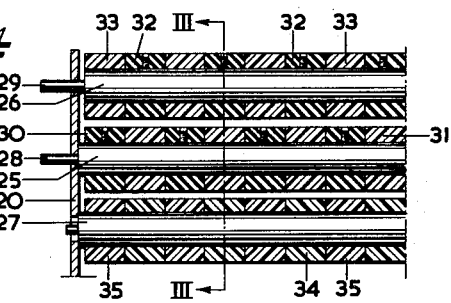
INVENTOR
THEO PIERRE CHRETIEN BREUERS
BY
ATTORNEY July 17, 1962     T. P. C. BREUERS     3,044,769
DEVICE FOR SEPARATING TWO SHEETS OF LAMINAR MATERIAL
Filed March 14, 1961     2 Sheets-Sheet 2
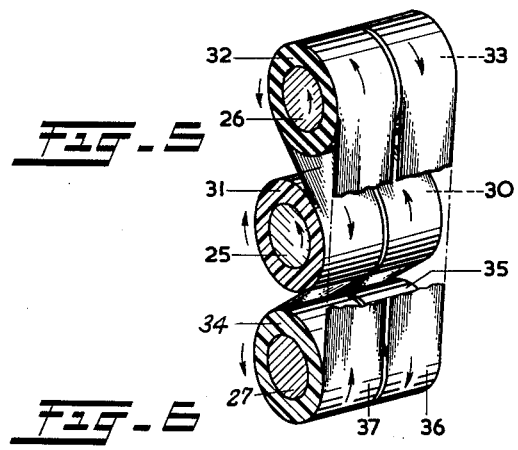
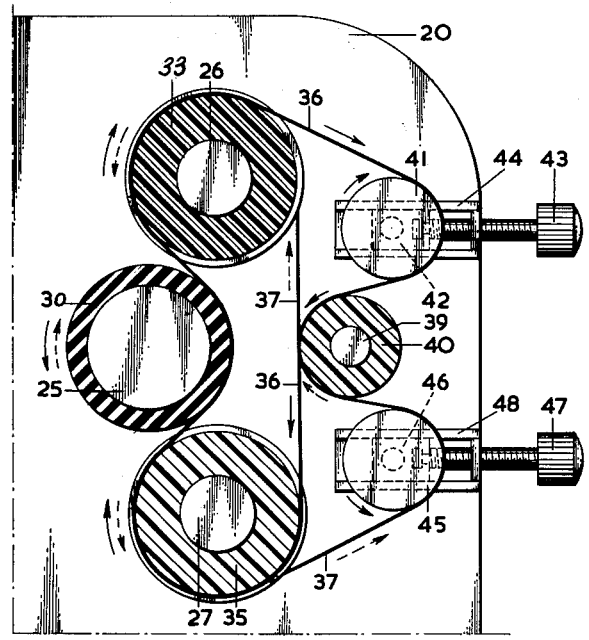
INVENTOR
THEO PIERRE CHRETIEN BREUERS
BY
ATTORNEY

United States Patent Office 3,044,769
Patented July 17, 1962

3,044,769
DEVICE FOR SEPARATING TWO SHEETS OF LAMINAR MATERIAL
Theo Pierre Chrétien Breuers, Venlo, Netherlands, assignor to Chemische Fabriek L. Van der Grinten N.V., Venlo, Netherlands, a Dutch corporation
Filed Mar. 14, 1961, Ser. No. 95,659
Claims priority, application Netherlands Mar. 28, 1960
5 Claims. (Cl. 271—18)

The invention relates to a device for separating two moving superimposed sheets of paper or similar laminar material, comprising means for feeding the sheets, a number of spaced, power-driven conveyor members, mounted in line, which may come into frictional contact with the outside of one sheet, and a number of spaced juxtaposed separating members, which are staggered in relation to the conveyor members, and which are driven in a direction opposite to the direction of movement of the sheets and which may come into frictional contact with the outside of the other sheet, while every line on the working surface of a conveyor member or a separating member which extends transverse to the direction of movement of the member describes the same closed path.

In United States patent specification No. 2,766,044 a continuously operating photoprinting apparatus is described, which is equipped with a device for separating the sheets (original and photoprinting material) which together form an exposure set. In this device two disk rollers are mounted in such a way that the disks of one roller extend into the spaces between the disks of the other roller. The exposure set is fed to the disk rollers by the exposure cylinder and a number of conveyor belts passing round it. The sheet of photoprinting material is then gripped and moved further by one disk roller, the so-called conveyor roller, which rotates in the direction of movement of the sheets, while the other disk roller, the so-called separating roller, which rotates against the direction of movement of the sheets, arrests the original. Owing to the driving action of the exposure cylinder and the conveyor belts the original is upset and doubled in the form of a loop, as a result of which it is disengaged from the photoprinting material.

This known device operates in a fairly reliable way if the leading edges of the sheets to be separated are in register and also if the photoprinting material extends beyond the original, but not if the original extends beyond the photoprinting material. In that case it is possible for the original along with the photoprinting material to be passed completely between the disk rollers, or at least until it is gripped by conveyor members mounted behind the rollers, before the separating roller can exert a sufficient counteracting friction force on the original. In fact, a sheet which has got between the disk rollers is wrinkled transversely and thus stiffened longitudinally. If both the original and the photoprinting material have got between the disk rollers and have been wrinkled, the friction which is exerted by the moving photoprinting material on the original owing to clamping action may be greater than the friction of the separating roller exerted on the original. The latter is then carried along. If, however, the separating roller gains a sufficient hold of the original, the latter is rubbed back, but can be seriously damaged if it is driven forward from the exposure unit against the rubbing action of the separating roller, and is upset in spite of its stiffness caused by the wrinkling.

If the sheets of photoprinting material passing between the disk rollers have to undergo some further treatment in the apparatus, i.e. if they have to be developed or guided in a different direction, this cannot be done until the sheets are completely flat again. This implies that after passing between the disk rollers the sheets have to travel a certain distance so as to be enabled to flatten out again. Owing to this no compact construction of the apparatus is possible.

Another drawback is that as a broad sheet passes between the disk rollers considerable compressive forces may be exerted on it, even to the extent that, when the materials handled are thin, the relatively small disks may be pressed through the material.

It is an object of the invention to obviate the drawbacks of the known device and to make possible a reliable separation of two superimposed sheets of laminar material, irrespective of whether the leading edges of these sheets are or are not in register.

A further object of the invention is to provide a sheet separation device of the character indicated which can be used in apparatus of very compact construction, of which the sections for handling the sheets are situated close together and at different levels, for instance one above the other.

Specific embodiments of apparatus according to the invention are illustrated in the accompanying drawings, in which:

FIGURE 1 is a diagrammatical cross-section, along the line I—I' in FIGURE 2, of a device according to the invention, in which the conveyor members and the separating members are constructed as rollers and the supporting members as resilient strips.

FIGURE 2 is a diagrammatical longitudinal section of this device along the line II—II' in FIGURE 1.

FIGURE 3 is a diagrammatical cross-section, along the line III—III' in FIGURE 4, of a section of a photoprinting apparatus comprising a device according to the invention, in which the conveyor members and the supporting members cooperating with the separating members are constructed as rollers, and the separating members and the supporting members cooperating with the conveyor members as tensioned endless belts.

FIGURE 4 is a diagrammatical longitudinal section of a part of this apparatus along the line IV—IV' in FIGURE 3.

In FIGURE 5 a conveyor member and a separating member and two supporting members of the device according to FIGURES 3 and 4 are shown diagrammatically on an enlarged scale, in a perspective view.

FIGURE 6 is a diagrammatical cross-section of a further embodiment of the device according to the invention, in which the tension in the separating belts and the tension in the supporting belts can be varied.

In the device according to FIGURES 1 and 2 in the side-plates of frame 1 shafts 2 and 3 are rotatably supported. These shafts are driven by driving members (not shown) acting on the journals 4 and 5 passing through the frame plates in the direction which is indicated by arrows in FIGURE 1. Shaft 2 is provided with sleeve-shaped thickenings 6 and shaft 3 has disk-shaped thickenings 7. The thickenings 6 and 7 respectively are coated with somewhat elastic rubber of about 70° Shore. The thickenings 6 act as conveyor members; the thickenings 7 act as separating members.

Rigidly mounted between the plates of frame 1 is a shaft 8, which supports resilient strips 9. A rigidly mounted shaft 10 supports a number of resilient strips 11. The strips 9 and 11, which are coated with "Teflon" (polyfluorethylene of E. I. du Pont de Nemours & Co. (Inc.), Wilmington, Delaware, U.S.A.), act as supporting members. The strips 9 pass between the thickenings 6 of shaft 2 and rest under slight pressure on the thickenings 7 of shaft 3, while the strips 11 pass between the thickenings 7 of shaft 3 and rest under slight pressure on the thickenings 6 of shaft 2. The shafts 2, 3 and the strips 9, 11 are mounted in such a way that the pressure zones between the strips 9 and the thickenings 7 lie in the same plane as the pressure zones between the strips 11 and the thickenings 6.

Mounted in bearings in the plates of frame 1 are also the power-driven feed rollers 12 and 13 (driven by members not shown in the drawing). The rollers 12 and 13 are provided with rubber covers.

If laminar material is guided via guiding plate 14 between the rollers 12 and 13, these rollers feed the material via guiding plate 15 between the rollers 2 and 3. If in this way one sheet of laminar material is fed, the lowerside of the sheet is forced against the conveyor members 6 by the strips 11 and the upperside of the sheet against the separating members 7 by the strips 9. Owing to their greater width the members 6 exert a greater friction force on the sheet than the members 7. Consequently the sheet is taken along by the members 6 and moved further via guiding plate 16. During this movement the disks 7 rub over the upperside of the sheet without preventing its movement. The friction between the sheet fed through and the strips 9 and 11 respectively is negligibly small owing to the smoothness of the "Teflon"-coating of the strips.

If two superimposed sheets of laminar material are fed by the rollers 12 and 13, the sheet turned towards shaft 2 is guided to the guiding plate 16 and the other sheet is arrested by the separating members 7, separated from the first sheet, and finally guided to table 17. In fact, between the rollers 13 and 3 this sheet will bulge more and more. At a given moment the leading edge of the sheet will then be taken along by the disks 7 to table 17.

If the sheets fed are superimposed in such a manner that the upper sheet extends beyond the lower sheet, the leading edge of the upper sheet at first comes into contact with the conveyor members 6 of shaft 2. It is then taken along by the greater driving friction force of the conveyor members. If, however, the lower sheet has moved until it has got between the upper sheet and the conveyor members, so that the driving force no longer acts on the upper sheet, this sheet is rubbed back by the friction force of the disks 7 beyond the pressure zone and separated from the lower sheet.

The friction forces occurring in the device are greatly dependent on the pressure under which the supporting members cooperate with the conveyor members and the separating members; hence the shafts 8 and 10, to which are secured the strips 9 and 11 acting as supporting members, are preferably mounted so as to be somewhat rotatable. By turning the shafts 8 and 10 it is possible to vary the pressure of the strips 9 and 11 on the separating members 7 and the conveyor members 6 as required.

The stationary strips 9 and 11 can be replaced by moving supporting members such as supporting rollers or supporting disks, rotatably supported on the shafts 2 and 3, and mounted in the spaces between the conveyor rollers 6 and the separating disks 7. Such a construction presents the advantage that the supporting members exert no sliding friction on the sheets. The pressure between the supporting members and the conveyor members and separating members can be varied if shaft 2 or shaft 3, or both, is (are) supported in movable bearings.

The conveyor rollers may also consist of a system of spaced conveyor belts, tensioned round rollers. One of the rollers may then act as a driving roller for the belts. Instead of feeding rollers, endless conveyor belts passing round rollers and bearing on each other may also be used.

In FIGURES 3, 4 and 5 a device according to the invention which forms part of a continuously operating photoprinting apparatus and which serves to separate the sheets which together form a photoprinting set (laminar original and sheet of photoprinting material) is shown diagrammatically.

The photoprinting apparatus comprises an exposure cylinder 21 rotatably mounted between frame plates 20. Round the exposure cylinder and guiding roller 22 a number of juxtaposed power-driven conveyor belts 23 are present. Between the belts 23 and cylinder 21 the photoprinting sets are guided round a light-source (not shown) mounted inside cylinder 21. From the space above the parts of the conveyor belts 23 which extend between cylinder 21 and guiding roller 22, air is sucked away. Owing to the air stream thus produced (see the arrows in FIGURE 3) the photoprinting sets are sucked against the lowerside of the belts 23 after having been guided round cylinder 21. In many cases, however, the original will, as it leaves cylinder 21, be disengaged from the light-sensitive sheet and thus be separated therefrom. If, however, the original has an edge extending beyond the photoprinting material, which edge is sucked against the belts 23, or if the two sheets adhere to each other through one cause or another (owing to static electricity, for instance) both sheets are taken along by the belts 23.

Guiding roller 22 is fitted with circumferential grooves. Extending into these grooves between the belts 23 are guiding rods 24. The other ends of the guiding rods extend to the device for the separation of the sheets. This device comprises the shafts 25, 26, and 27 supported in bearings in frame 20. The shafts 25 and 26 supported in stationary bearings are driven, via the journals 28 and 29 passing through frame plates 20, in the direction which is indicated by arrows in the figures. Shaft 27 is movably supported in slots in frame 20 and is not power-driven. Rigidly mounted on shaft 25 by means of screws are a number of conveyor rollers 30, while in the spaces between the rollers 30 a number of supporting rollers 31 are rotatably supported.

Rigidly mounted on shaft 26 by means of screws are a number of driving rollers 32, while between the rollers 32 guiding rollers 33 are rotatably supported on shaft 26. On shaft 27 guiding rollers 34 and 35 are rotatably supported. Round each conveyor roller 30, guiding roller 33, and guiding roller 35 is tensioned an endless supporting belt 36, and round each supporting roller 31, driving roller 32, and guiding roller 34 is tensioned a separating belt 37. The tension in belts 36 and 37 is obtained by the weight of shaft 27. Because the rollers 30 and 31 have equal diameters, just like the rollers 32, 33 and the rollers 34, 35, the zones in which the separating belts 37 rest against the supporting rollers 31 and the zones in which the supporting belts 36 rest against the conveyor rollers 30 lie in the same (naturally curved) plane.

The separating belts 37 are driven by the driving rollers 32. The parts of the belts 37 coming into contact with the supporting rollers 31 will thus move in the direction opposite to the surfaces of the conveyor rollers 30. If there is no laminar material in the device, the conveyor rollers 30 will take along the supporting belts 36. The supporting belts 36 and the separating belts 37 will then move in opposite directions (see FIGURE 5).

The conveyor rollers 30 are fitted with a cover of the high-friction product "Vulkollan" (polyurethane of Bayer A. G., Leverkusen, Germany), the supporting belts 36 and the separating belts 37 are made of the lower-friction polyethene, and the driving rollers 32 have a cover of rubber. The supporting rollers 31 and the guiding rollers 33, 34, and 35 are made of the product "Akulon" (polyamide of Algemene Kunstzijde Unie N. V., Arnhem, The Netherlands).

It has been found that in a device of this construction many photoprinting sets, which are composed in different ways of the light-sensitive materials commonly used in the photoprinting technique (such as diazo paper, diazo linen, tracing paper, tracing film and the like) and originals (such as tracings, letters, film positives and the like), can be separated.

A sheet of photoprinting material coming from cylinder 21 (when the original has already fallen off) is guided via the conveyor belts 23 and the guiding rods 24 to the zones of contact between the conveyor rollers 30 and supporting rollers 31 and the supporting belts 36 and separating belts 37. Owing to the greater friction of the conveyor rollers 30 it is gripped there and moved further to guiding member 38. During the movement the separating belts rub over the side of the sheet that is turned towards them. However, the friction resulting from this is too small to prevent the movement; the friction per unit of area is so small that the surface of the sheet is not damaged.

If both sheets of the photoprinting set get between the rollers 30 and 31 and the belts 36 and 37, the light-sensitive sheet which comes into contact with the rollers 30 is taken along and moved further. The original coming into contact with the separating belts 37 is arrested by the friction forces of these belts acting in the direction opposite to the movement of the set. Owing to the driving action of cylinder 21 and conveyor belts 23 the original is then upset and doubled in the form of a loop, as a result of which it is disengaged from the light-sensitive sheet and falls off.

The device described functions in a very reliable way, even if the original has an edge extending beyond the light-sensitive sheet. In such a case the extending part will at first be gripped by the conveyor rollers and taken along, but when the light-sensitive material has moved until it has got between the conveyor rollers and the original, the original is gripped by the separating belts and rubbed back altogether. The original is then upset and doubled in the form of a loop (as described above), and thus separated from the light-sensitive sheet.

The device according to FIGURE 6 is an improved embodiment of the device according to FIGURES 3 and 4. It is fitted with means by which the tension in the separating and the supporting belts, and thus the pressure under which the latter cooperate with the supporting rollers and the conveyor rollers, can be varied. Such an embodiment is useful if by means of the device sheets have to be separated successively from sets which are so different in composition that a different proportion between the forces acting on the sets is necessary for the different sets.

In this device the shafts 25, 26, and 27 are supported in stationary bearings in the frame plates 20. Mounted on these shafts (in the same way as in the device according to FIGURES 3 and 4) are conveyor rollers 30, supporting rollers 31, driving rollers 32, guiding rollers 33, 34, and 35 (only the rollers 30, 33, and 35 are shown in the drawing).

Furthermore the device comprises a shaft 39, supported in stationary bearings, on which guiding rollers 40 are rotatably supported. A tension roller 41 is supported in movable bearings 42. By turning adjusting screws 43, it is possible to move the bearings 42 between guiding members 44.

A tension roller 45 is supported in bearings 46, which can be moved between guiding members 48 by turning adjusting screws 47. Each supporting belt 36 is tensioned round a conveyor roller 30, guiding roller 33, tension roller 41, and the guiding rollers 40 and 35. By turning the screws 43 it is possible to vary the tension of the belts 36, and thus the pressure between these belts and the conveyor rollers 30 can be adjusted to the desired value.

The separating belts 37 are tensioned round the supporting rollers 31, driving rollers 32, guiding rollers 39, tension roller 45, and guiding rollers 34. By turning the screws 47 it is possibe to adjust the tension in the belts 37 to the desired value.

I claim:

1. Device for separating two moving superimposed sheets of paper or similar laminar material, comprising means for feeding the sheets, a number of spaced power-driven conveyor members, mounted in line, which may come into frictional contact with the outside of one sheet, and a number of spaced juxtaposed separating members, which are staggered in relation to the conveyor members and which are driven in a direction opposite to the direction of movement of the sheets and which may come into frictional contact with the outside of the other sheet, while every line on the working surface of a conveyor member or a separating member which extends transverse to the direction of movement of the member describes the same closed path, there being mounted in the spaces between the conveyor members a number of supporting members which cooperate under pressure with the separating members, and there being mounted in the spaces between the separating members supporting members which cooperate under pressure with the conveyor members, the pressure zones between the conveyor members and the supporting members cooperating with them lying in the same plane as the pressure zones between the separating members and the supporting members cooperating with them.

2. A device according to claim 1, wherein the supporting members are constructed as freely movable members, of which every line extending on the working surface transverse to the direction of movement describes the same closed path.

3. A device according to claim 1, wherein the conveyor members and the supporting members cooperating with the separating members are constructed as alternately juxtaposed rollers of the same diameter, mounted on one shaft, while the supporting members cooperating with the convyeor members and the separating members are constructed as alternately juxtaposed tensioned endless belts, which partly lap round the conveyor rollers and the supporting rollers.

4. A device according to claim 1, which includes means for varying the pressures under which the supporting members cooperate with the conveyor members and the separating members.

5. A device according to claim 1, wherein means are provided to ensure that the rate of movement of the surfaces of the separating members is greater than the rate of movement of the surfaces of the conveyor members.

References Cited in the file of this patent

UNITED STATES PATENTS 2,766,044     Schultz  ---------------- Oct. 9, 1956